(12) United States Patent
Butzmann

(10) Patent No.: US 10,333,329 B2
(45) Date of Patent: Jun. 25, 2019

(54) CELL ASSEMBLY HAVING A PLURALITY OF ELECTROCHEMICAL CELLS AND METHOD FOR OPERATING SAID CELL ASSEMBLY

(71) Applicants: Robert Bosch GmbH, Stuttgart (DE); Samsung SDI Co., Ltd., Yongin-si, Gyeonggi-do (KR)

(72) Inventor: Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 770 days.

(21) Appl. No.: 14/892,417

(22) PCT Filed: May 9, 2014

(86) PCT No.: PCT/EP2014/059514
§ 371 (c)(1),
(2) Date: Nov. 19, 2015

(87) PCT Pub. No.: WO2014/187682
PCT Pub. Date: Nov. 27, 2014

(65) Prior Publication Data
US 2016/0094073 A1 Mar. 31, 2016

(30) Foreign Application Priority Data
May 22, 2013 (DE) .................. 10 2013 209 404

(51) Int. Cl.
*H02J 7/00* (2006.01)
*H01M 10/44* (2006.01)
(Continued)

(52) U.S. Cl.
CPC ............ *H02J 7/0063* (2013.01); *B60L 58/19* (2019.02); *B60L 58/21* (2019.02);
(Continued)

(58) Field of Classification Search
None
See application file for complete search history.

(56) References Cited

U.S. PATENT DOCUMENTS

| | | |
|---|---|---|
| 5,336,568 A | 8/1994 | Andrieu |
| 2005/0052824 A1 | 3/2005 | Jyoya et al. |
| 2011/0198936 A1* | 8/2011 | Graovac .................. H02M 7/79 307/82 |

FOREIGN PATENT DOCUMENTS

| | | |
|---|---|---|
| CN | 102263524 A | 11/2011 |
| DE | 10 2011 004 248 A1 | 8/2011 |

(Continued)

OTHER PUBLICATIONS

International Search Report corresponding to PCT Application No. PCT/EP2014/059514, dated Jul. 22, 2014 (German and English language document) (5 pages).

*Primary Examiner* — Thienvu V Tran
*Assistant Examiner* — David M Stables
(74) *Attorney, Agent, or Firm* — Maginot, Moore & Beck LLP

(57) ABSTRACT

A method includes activating electrochemical cells of a cell assembly to output electrical energy in accordance with a superordinate clock signal in order to have an activation and/or switch-off time points of the respective cells on the basis of the superordinate clock signal not all occur at the same time. To reduce the complexity of smoothing the total battery voltage, the switching time points according to the disclosure are shifted on the basis of the superordinate clock signal for the first cell in accordance with a first switching specification by a cell-specific first clock shift signal.

10 Claims, 2 Drawing Sheets

(51) Int. Cl.
*H01M 10/42* (2006.01)
*B60L 58/19* (2019.01)
*B60L 58/21* (2019.01)

(52) U.S. Cl.
CPC ....... *H01M 10/425* (2013.01); *H01M 10/441* (2013.01); *H02J 7/0024* (2013.01); *B60L 2240/547* (2013.01); *Y02T 10/7011* (2013.01); *Y02T 10/7016* (2013.01); *Y02T 10/7061* (2013.01)

(56) References Cited

FOREIGN PATENT DOCUMENTS

| | | |
|---|---|---|
| DE | 10 2011 003 810 A1 | 8/2012 |
| DE | 10 2011 003 940 A1 | 8/2012 |
| EP | 1 289 096 A2 | 3/2003 |

* cited by examiner

CELL ASSEMBLY HAVING A PLURALITY OF ELECTROCHEMICAL CELLS AND METHOD FOR OPERATING SAID CELL ASSEMBLY

This application is a 35 U.S.C. § 371 National Stage Application of PCT/EP2014/059514, filed on May 9, 2014, which claims the benefit of priority to Serial No. DE 10 2013 209 404.3, filed on May 22, 2013 in Germany, the disclosures of which are incorporated herein by reference in their entirety.

BACKGROUND

The present disclosure relates to a method for operating a plurality of electrochemical cells and also to a cell assembly having a plurality of electrochemical cells. In particular, the present disclosure relates to improvements in the case of the switch-mode connection of individual cells so as to control a terminal voltage in a cell assembly.

Electrochemical storage cells are frequently connected in parallel circuits and/or in series circuits to cell modules so as to provide predefined electrical parameters. During the operation of the cells, care is to be taken that the cells are used in a uniform manner and in accordance with their state of charge and aging state so as to output electrical energy. In particular, in the case of increasing electrification of personal individual transport by means of electrically driven vehicles, there is a demand for long lasting and reliable cell modules. By way of example, a method is known for regulating the amount of energy that is output, wherein the battery voltage is set in a regulated manner using a PWM signal as a control signal that is transmitted to the individual cells. The PWM-command from a microcontroller or another logic unit is relayed at each cell to a power electronics system that connects the cells into the entire string using a predetermined clock signal ("duty cycle") or bridges said cells. In the case of this method, it is disadvantageous that all the cells are simultaneously connected or disconnected so that the total battery voltage is varied between its possible maximum value and 0. The resulting fluctuations of the output voltage render an accordingly large and cost-intensive choke necessary for the smoothing process. It is therefore an object of the present disclosure to eliminate the abovementioned disadvantages of the prior art.

SUMMARY

In accordance with the present disclosure, a method is proposed for operating a plurality of electrochemical cells of a cell assembly. It is possible to use battery cells from all common rechargeable battery technologies. By way of example, battery cells of the type Pb—lead-acid battery, NiCd—nickel-cadmium battery, $NiH_2$—nickel-hydrogen battery, NiMH—nickel-metalhydride battery, Li-Ion—lithium-ion battery, LiPo—lithium-polymer battery, LiFe—lithium-iron battery, LiMn—lithium-ion manganese battery, $LiFePO_4$—lithium iron phosphate battery, LiTi—lithium titanium battery, RAM—rechargeable alkaline manganese, Ni-Fe—nickel iron battery, Na/NiCl—sodium/nickel chloride high temperature battery SCiB—super charge ion battery, silver zinc battery, silicon battery, vanadium redox battery and/or zinc bromide battery. In particular, battery cells of the type lead/acid, nickel cadmium, nickel metal hydride and/or sodium/sodium nickel chloride cells are used. It is particularly preferred that battery cells of the type lithium ion cells are used. The cell assembly can be used by way of example to drive a means of locomotion, in particular of an automobile, for individual personal transport. The method in accordance with the disclosure comprises the step of defining a first switching command for a first cell of the cell assembly. The energy output characteristic of the first cell is defined with the first switching command. By way of example, this can be defined in the ratio to other cells or to an absolute reference. In particular, the switching command can be predetermined by a connecting/disconnecting ratio ("duty cycle") in accordance with a type of a pulse width modulation (PWM). By way of example, this can occur within a central battery management system (BMS), within a cell module controller or within a controller of an individual cell. Furthermore, the method comprises the step of generating a master clock signal to connect the first cell and a second cell to the cell assembly. This master clock signal can correspond by way of example to a total energy requirement of the cell assembly. Alternatively or in addition thereto, the master clock signal can be generated so as to disconnect the first cell and a second cell of the cell assembly. In accordance with the disclosure, the method comprises the step of postponing a point in time at which the first cell is connected and/or disconnected in accordance with the first switching command by means of a cell-specific first clock shift signal. In other words, the master clock signal is delayed in dependence upon the switching command for the first cell by means of a cell-specific signal so that the point in time when the first cell is connected and/or disconnected does not necessarily coincide with that of the other cells. The clock shift signal can be generated in particular within a controller of the first cell. The voltage excursion of the cell assembly is consequently prevented in accordance with the disclosure from varying regularly between the possible maximum value of the voltage of the cell assembly and 0.

The dependent claims disclose preferred further developments of the disclosure.

It is further preferred that the connection and/or disconnection of the second cell is postponed in accordance with a second switching command by means of a cell-specific second clock shift signal. In other words, for a second cell of the cell assembly corresponding to the first cell, an intrinsic clock shift signal is generated and is used to prevent points in time at which cells are connected and/or disconnected from coinciding with one another chronologically. This provides the advantages that are explained above in connection with the first cell.

It is preferred that the first clock shift signal can be generated in the first cell and the second clock shift signal is generated in the second cell. In other words, the clock shift signal is generated in contrast in a manner that is decentralized with respect to the master clock signal. This can occur by way of example within a cell controller that is exclusively allocated to the first cell or exclusively allocated to the second cell; alternatively, however, this could also occur by means of a cell controller that is allocated to multiple cells. In this manner, the clock shift signal can be generated in particular at the location where the state of the respective storage cell is also determined. In this manner, it is possible to achieve a modular construction of the information processing infrastructure of the cell assembly and signaling processes.

It is preferred that the first clock shift signal and alternatively or in addition thereto, the second clock shift signal can be changed by means of a random algorithm. In other words, a delay of the master clock signal for applying a clock signal to the first cell and/or the second cell is not the same in each clock phase but rather is varied randomly. The random algorithm can provide in particular different values for the first cell and/or the second cell. It is clear that the respective random algorithms can also be used to generate respective clock signals for the cells. Alternatively or in addition thereto, a respective predefined value can be used to delay the master clock signal when applying said clock signal to a specific cell and the clock shift signal can be accordingly postponed. These embodiments prevent a frequent, simultaneous connection of the electrochemical storage cells that are located in the cell assembly. A choke that is required for the smoothing process can therefore be made smaller.

In particular, the cell-specific first clock signal and the cell-specific second clock signal can be different. This can occur by means of different predefined values for delaying the cell-specific master clock signal. Alternatively, a random algorithm can be used for a first cell and a rigidly predefined value can be used as a clock signal for a second cell.

It is preferred that the contributions of the first cell and the second cell in accordance with the disclosure can be tailored to a predefined energy output of the cell assembly in that the master clock signal for connecting the first cell is postponed in addition to the first clock shift signal by means of a cell-specific clock shift signal. The third clock shift signal can be generated in dependence upon a state of the first cell and in particular is dimensioned in dependence upon the state of the first cell. In other words, not only are the respective points in time at which the cells are connected offset by means of the first clock shift signal but rather also a cell-specific adjustment of the switching command is achieved for controlling the power output of the first cell and therefore of the entire cell module. The third clock shift signal can be generated and applied in response to a predefined, determined state of the first cell. In addition, in particular a quantitative dependency between the cell state and the third clock shift signal can be achieved. In other words, by way of example, with a worsening aging state and/or state of charge of the first cell, the master clock signal can be delayed before being applied to the first cell in such a manner that over a longer period of time that is taken into account, another connecting/disconnecting ratio for the first cell occurs. Alternatively or in addition thereto, the master clock signal for connecting the second cell can be postponed accordingly in addition by means of a cell-specific fourth clock shift signal that is generated in dependence upon a state of the second cell and is dimensioned in particular in dependence upon the state of the second cell. The explanations regarding the third clock shift signal apply accordingly in connection to the first cell.

It is preferred that the third and/or the fourth clock shift signal can postpone the master clock shift signal by more than one period of the clock signal. In this manner, cells that are capable of delivering power can provide a greater contribution and weaker cells can provide a smaller contribution to the total voltage (energy output or power output) of the battery. For this purpose, initially the master clock signal is delayed by more than one period so that the respective switching command can be correctly determined by a cell controller and it is possible in a second step to set the third clock shift signal and also the duty-cycle (the connecting/disconnecting ratio) that is generated in accordance with the above-described method.

Furthermore, it is preferred that the switching command is a duty cycle, in particular a pulse width modulation (PWM) duty cycle. In accordance with a further aspect of the present disclosure, a cell assembly having a plurality of electrochemical cells is proposed. The cell assembly comprises a first electrochemical cell and a second electrochemical cell. Furthermore, the cell assembly comprises a first power electronics arrangement that is allocated to the first cell and a second power electronics arrangement that is allocated to the second cell, and also a signal generating unit for generating a switching command. The first and also the second power electronics arrangement can be embodied by way of example as a switch that can be controlled, said switch being utilized in response to the (delayed in accordance with the disclosure) master clock signal. Furthermore, the cell assembly comprises a first logic unit and a second logic unit that are allocated in each case to the first cell or the second cell respectively. In accordance with the disclosure, the first power electronics arrangement and the second power electronics arrangement are consequently configured so as to connect the first cell or the second cell of the cell assembly or to bridge said first cell and said second cell with respect to the cell assembly. The cell assembly is configured in accordance with the disclosure so as to implement a method as is described above in detail. The advantages of the cell assembly in accordance with the disclosure are also evident accordingly in the above explanations of the method in accordance with the disclosure.

It is preferred that the cell assembly comprises a series circuit and/or a parallel circuit of the first cell and the second cell. In other words, the switching commands that are described above in accordance with the disclosure are used for the purpose of connecting the first cell and the second cell to a series circuit or in each case to bridge said cells within a series circuit or to connect the first cell and the second cell to a parallel circuit or to separate said cells from the parallel circuit. These assemblies render it possible to flexibly set the electrical parameters of an electrochemical storage module that comprises the cells.

BRIEF DESCRIPTION OF THE DRAWINGS

Exemplary embodiments of the disclosure are described in detail hereinunder with reference to the accompanying drawings. In the drawings.

DETAILED DESCRIPTION

Figure 1:
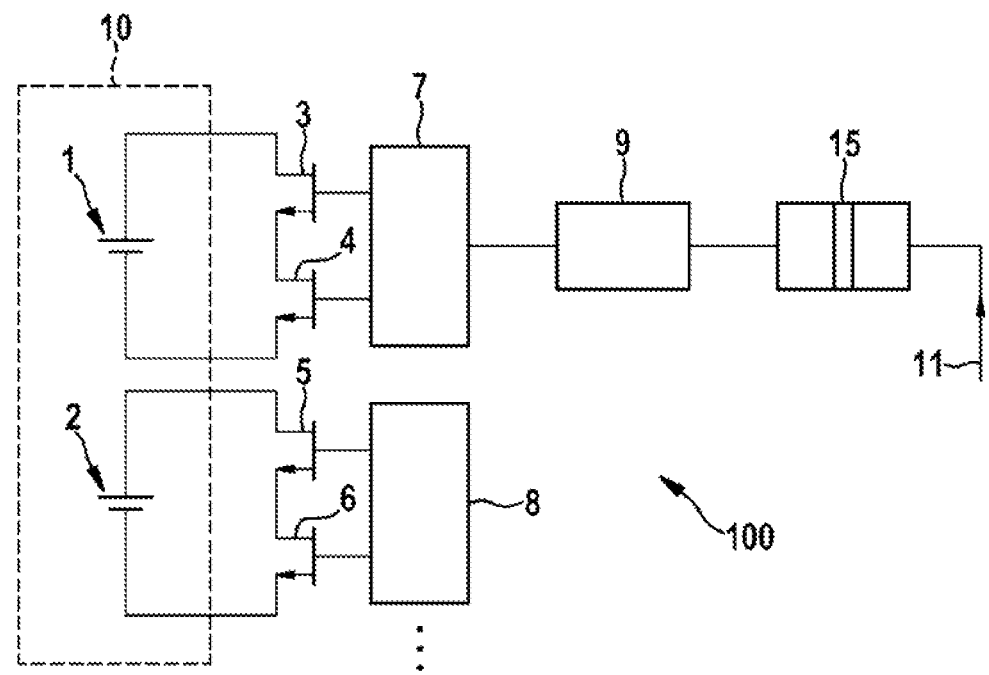
FIG. 1 illustrates a circuit diagram of a cell assembly in accordance with an exemplary embodiment of the present disclosure.

FIG. 1 illustrates a simplified diagram of an exemplary embodiment of a cell assembly 100 in accordance with the present disclosure. The cell assembly 100 comprises a first cell 1 and a second cell 2. The first cell 1 and the second cell 2 are connected in series to a cell module 10 and are configured so as to be bridged or to be left connected to the cell module 10 by means of a first power electronics system and a second power electronics system, said power electronics systems comprising a first transistor 3 and a second transistor 4 or a third transistor 5 and a fourth transistor 6. The transistors 3 to 6 are configured as power transistors so as to be controlled by means of a first microcontroller 7 as a first logic unit or a second microcontroller 8 as a second logic unit. The first microcontroller and the second microcontroller are configured so as to generate a first switching command or a second switching command for the first cell 1 or the second cell 2 of the cell assembly 100. The first microcontroller 7 and the second microcontroller 8 are supplied by means of a master third microcontroller 9 by means of a PWM-command as a master clock signal. The third microcontroller 9 can be configured so as to change the PWM command in response to an electrical power that is required by the cell assembly 100 in order to increase or to decrease the electrical power of the cell assembly 100. It is preferred that for each battery module 10 in each case an insulator 11 is present, by way of example an optocoupler, so as to transmit a signal 11.

Figure 2:
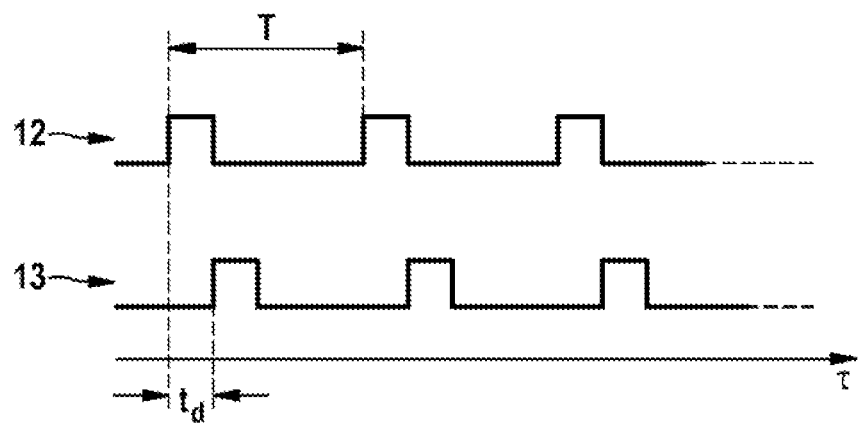
FIG. 2 illustrates a timing diagram of a master clock signal and a clock signal that results from an exemplary embodiment of the method in accordance with the disclosure.

FIG. 2 illustrates a timing diagram of a master clock signal 12 that comprises a period duration T. The time signal of a signal 13 that is delayed in accordance with the disclosure on the basis of a first switching command is illustrated below, wherein all switch-on points in time of the master clock signal 12 are delayed by a clock shift signal $t_d$. Assuming that the master clock signal 12 of each cell 1, 2 in the connection of the cell assembly 100 is delayed by a different value $t_d$, points in time when the individual cells are connected never coincide and the maximum voltage excursions of the cell assembly are considerably reduced.

Figure 3:
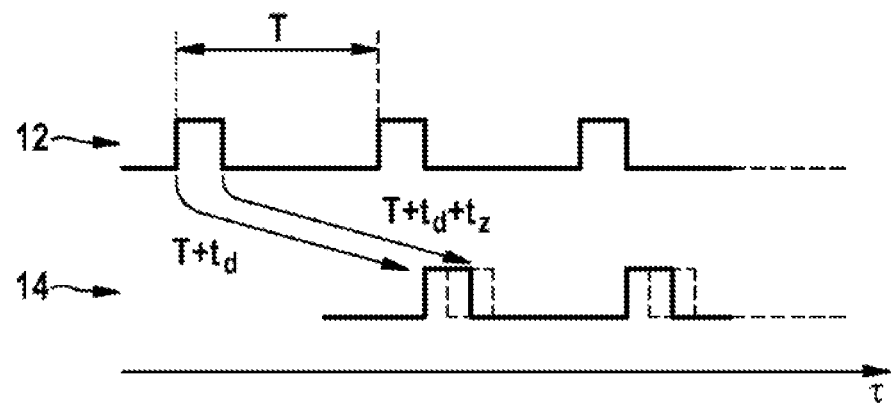
FIG. 3 illustrates a timing diagram of a clock signal and a master clock signal that is delayed by means of a first and a third clock shift signal.

FIG. 3 illustrates a master clock signal 12 that has been delayed by means of a first cell-specific clock shift signal 13 $t_d$ and in addition by means of a third cell-specific clock shift signal $t_z$. In other words, the signal 14 is produced from an additional chronological delay of the signal 13 that is illustrated in FIG. 2 by an additional chronological delay $t_z$. It is evident that the resulting signal 14 is delayed by means of the third clock shift signal by clearly more than a period T of the master clock signal 12. In this manner, the mean connecting period of an electrochemical energy storage device (for example the first cell 1) that is delayed by means of the signal 14 is reduced.

Figure 4:
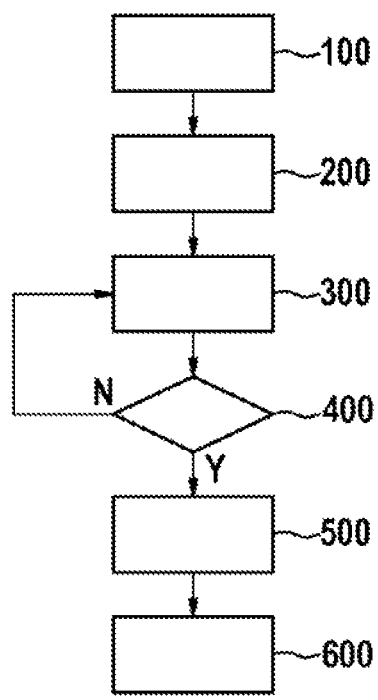
FIG. 4 illustrates a flow diagram, illustrating steps in accordance with an exemplary embodiment of the method in accordance with the disclosure.

FIG. 4 illustrates a flow diagram that illustrates steps in accordance with an exemplary embodiment for a method in accordance with the disclosure. In step 100, a first switching command is defined for a first cell 1. By way of example, this can be a single identification of a PWM ratio (connecting/disconnecting ratio) of the first cell 1 that is used to ensure that the switching commands as a result of the master clock signal 12 do not coincide chronologically with the other cells that are present in the assembly. In step 200, the master clock signal 12 is generated. By way of example, this can be the same for all the cells that are present in the cell assembly. In accordance with the prior art, all the cells in the assembly would be connected or disconnected at the same times. In step 300, the master driver signal 12 is postponed in a cell-specific manner by the switching command that is defined in step 100 (by means of the corresponding clock shift signal 13). In step 400, a check is performed as to whether the state of the first cell 1 requires an additional postponing of the point in time of connecting or disconnecting the cells. If this is not the case ("N"), in step 300, the clock signal 12 is only postponed on the basis of the first switching command or the first cell-specific clock shift signal 13. If this however is the case ("Y"), in step 500, the signal that is generated and delayed in a cell-specific manner in step 300 is delayed in addition by means of the third clock shift signal. By way of example, this can mean a considerably longer chronological delay of the master clock signal 12 prior to its being applied to the first cell 1, whereby the cell state can be taken into account. To conclude, the method in accordance with the disclosure ends in step 600.

Even if the exemplary embodiments and features in accordance with the disclosure have been described in detail with reference to the drawings, modifications and combinations of the disclosed features remain within the scope of knowledge of the person skilled in the art without departing from the scope of the present disclosure whose scope of protection is defined by means of the attached claims.

The invention claimed is:

1. A method for operating a plurality of electrochemical cells of a cell assembly, comprising:
   defining a first switching command for a first electrochemical cell of the cell assembly;
   generating a master clock signal for the electrochemical cells, the master clock signal defining timing at which the electrochemical cells are to be connected to the cell assembly and disconnected from the cell assembly;
   supplying the master clock signal to at least the first electrochemical cell and a second electrochemical cell of the plurality of electrochemical cells such that the first electrochemical cell and the second electrochemical cell have substantially identical timing for connecting to the cell assembly and disconnecting from the cell assembly; and
   shifting points in time at which the first electrochemical cell is connected to the cell assembly in accordance with the first switching command with a cell-specific first clock shift signal.

2. The method as claimed in claim 1, further comprising:
   defining a second switching command for the second electrochemical cell of the cell assembly;
   shifting points in time at which the second electrochemical cell is connected to the cell assembly in accordance with the second switching command with a cell-specific second clock shift signal.

3. The method as claimed in claim 2, further comprising:
   generating the first clock shift signal in the first electrochemical cell; and
   generating the second clock shift signal in the second electrochemical cell.

4. The method as claimed in claim 2, further comprising:
   changing at least one of the first clock shift signal and the second clock shift signal with a random algorithm.

5. The method as claimed in claim 2, wherein the cell-specific first clock shift signal shifts the points in time for connecting the first electrochemical cell by a first amount and the cell-specific second clock shift signal shifts the points in time for connecting the second electrochemical cell a second amount, and
   wherein the first amount and the second amount are different.

6. The method as claimed in claim 1, further comprising:
   tailoring contributions of the first electrochemical cell and the second electrochemical cell to an energy output of the cell assembly;
   postponing the points in time for connecting the first cell with a cell-specific third clock shift signal in addition to the cell-specific first clock shift signal, said third clock shift signal generated in dependence upon a state of the first electrochemical cell; and/or
   postponing the points in time for connecting the second electrochemical cell with a cell-specific fourth clock shift signal in addition to the cell-specific second clock shift signal, said fourth clock shift signal generated in dependence upon a state of the second electrochemical cell.

7. The method as claimed in claim 6, wherein postponing the points in time for connecting the first electrochemical cell with a cell-specific third clock shift signal in addition to the cell-specific first clock shift signal results in the points in time being shifted by by more than a period of the master clock signal, and wherein postponing the points in time for connecting the second electrochemical cell with a cell-specific fourth clock shift signal in addition to the cell-specific second clock shift signal results in the points in time being shifted by more than a period of the master clock signal.

8. The method as claimed in claim 1, wherein the first switching command is a duty cycle.

9. A cell assembly having a plurality of electrochemical cells, comprising:
 a first electrochemical cell;
 a second electrochemical cell;
 a first power electronics arrangement allocated to the first electrochemical cell;
 a second power electronics arrangement allocated to the second electrochemical cell;
 a signal generating unit configured to generate a switching command;
 a first logic unit allocated to the first electrochemical cell;
 a second logic unit allocated to the second electrochemical cell,
 wherein the first power electronics arrangement and the second power electronics arrangement in each case are configured so as to connect the first electrochemical cell or the second electrochemical cell to the cell assembly, respectively, and/or in each case to disconnect the first electrochemical cell or the second electrochemical cell from the cell assembly, respectively, and
 wherein the cell assembly is configured to implement a method for operating the plurality of electrochemical cells including
  (i) defining the switching command for the first electrochemical cell,
  (ii) generating a master clock signal for the electrochemical cells, the master clock signal defining timing at which the electrochemical cells are to be connected to the cell assembly and disconnected from the cell assembly,
  (iii) supplying the master clock signal to at least the first electrochemical cell and a second electrochemical cell of the plurality of electrochemical cells such that the first electrochemical cell and the second electrochemical cell have substantially identical timing for connecting to the cell assembly and disconnecting from the cell assembly, and
  (iv) shifting points in time at which the first electrochemical cell is connected to the cell assembly in accordance with the switching command with a cell-specific first clock shift signal.

10. The cell assembly as claimed in claim 9, wherein the first electrochemical cell and the second electrochemical cell are connected in the form of a series circuit to a common cell assembly.

* * * * *